(12) United States Patent
Ding

(10) Patent No.: US 10,764,042 B2
(45) Date of Patent: Sep. 1, 2020

(54) PASSWORD BASED KEY EXCHANGE FROM RING LEARNING WITH ERRORS

(71) Applicant: Jintai Ding, Cincinnati, OH (US)

(72) Inventor: Jintai Ding, Cincinnati, OH (US)

( * ) Notice: Subject to any disclaimer, the term of this patent is extended or adjusted under 35 U.S.C. 154(b) by 174 days.

(21) Appl. No.: 15/765,238

(22) PCT Filed: Sep. 2, 2016

(86) PCT No.: PCT/CN2016/097895
§ 371 (c)(1),
(2) Date: Mar. 30, 2018

(87) PCT Pub. No.: WO2017/041669
PCT Pub. Date: Mar. 16, 2017

(65) Prior Publication Data
US 2018/0302218 A1   Oct. 18, 2018

Related U.S. Application Data

(60) Provisional application No. 62/215,186, filed on Sep. 8, 2015.

(51) Int. Cl.
| | | |
|---|---|---|
| G06F 21/00 | (2013.01) | |
| H04L 9/08 | (2006.01) | |
| G06F 17/16 | (2006.01) | |
| H04L 9/30 | (2006.01) | |
| H04L 9/32 | (2006.01) | |

(52) U.S. Cl.
CPC .......... *H04L 9/0844* (2013.01); *G06F 17/16* (2013.01); *H04L 9/3013* (2013.01); *H04L 9/3073* (2013.01); *H04L 9/3273* (2013.01)

(58) Field of Classification Search
CPC .............................. H04L 9/0844; G06F 17/16
USPC ........................................................ 713/171
See application file for complete search history.

(56) References Cited

U.S. PATENT DOCUMENTS

| | | | |
|---|---|---|---|
| 9,246,675 B2 | 1/2016 | Ding | |
| 2008/0046732 A1* | 2/2008 | Fu | G06Q 20/3674 713/171 |
| 2008/0069344 A1* | 3/2008 | Yao | H04L 9/0844 380/44 |
| 2009/0154711 A1* | 6/2009 | Jho | H04L 9/083 380/286 |

FOREIGN PATENT DOCUMENTS

CN          104396184 A          3/2015

OTHER PUBLICATIONS

J. Ding et al., "A Simple Provably Secure Key Exchange Scheme Based on the Learning with Errors Problem,"Cryptology ePrint Archive: Report 2012/688, Jul. 29, 2014.

* cited by examiner

*Primary Examiner* — Anthony D Brown
(74) *Attorney, Agent, or Firm* — BakerHostetler

(57) ABSTRACT

Use the same basic idea of KE based on Ring LWE, this invention gives constructions of a new authenticated key exchanges system, where the authentication is achieved through a shared password between two parties. These new systems are efficient and have very strong security property including provable security and resistance to quantum computer attacks. This invention can also be modified using the LWE problem.

20 Claims, 5 Drawing Sheets

Explicitly Authenticated Protocol

Implicitly Authenticated Protocol

Multiplicative Protocol

Multiplicative Implicitly Authenticated Protocol

PASSWORD BASED KEY EXCHANGE FROM RING LEARNING WITH ERRORS

The present disclosure is a National Stage of International Application No. PCT/CN2016/097895, filed Sep. 2, 2016, which claims priority to the U.S. provisional patent application 62/215,186, entitled "Password Based Key Exchange from Ring Learning with Errors," filed Sep. 8, 2015, which are incorporated herein by reference in their entireties and for all purposes.

BACKGROUND

In our modern communication systems like Internet, cell phone, etc, to protect the secrecy of the information concerned, we need to encrypt the message. There are two different ways to do this. In the first case, we use symmetric cryptosystems to perform this task, where the sender uses the same key to encrypt the message as the key that the receiver uses to decrypt the message. Symmetric systems demand that the sender and the receiver have a way to exchange such a shared key securely. In an open communication channel without any central authority, like wireless communication, this demands a way to perform such a key exchange (KE) in the open between two parties. In a system with a central server, like a cell phone system within one cell company, this demands an efficient and easy to use key exchange system between the server and the clients.

This invention is related to the construction of an authenticated key exchange (KE) systems, where the authentication is achieved using a simple password. Such a system is very useful for many applications, in particular, the case where a client wants to communicate securely with a server, and where the only share secret is the password or certain hash value of a password. We call such a key exchange a password-authenticated key exchange (PAKE).

PAKE systems were proposed in [BMc], [Mc], whose security is based on the hardness of discrete logarithm problems. This system can be broken by future quantum computers as showed in the work of Shor [SHO].

In this invention, we construct new PAKEs that can resist quantum computer attacks use the LWE problem. The invention is based on the new KE from the LWE problem first constructed in the US Patent "Cryptographic systems using pairing with errors" with U.S. Pat. No. 9,246,675.

BRIEF SUMMARY OF THE INVENTION

This invention first contains a novel method, as illustrated in FIG. 5, for two parties i and j to perform a secure authenticated KE over an open communication channel assuming that they share a secret password π. This method is based on the idea of the computation of pairing of the same bilinear form in two different ways but each with different small errors. The shared key is derived from the pairings with a rounding technique. This method can be viewed as an extension of the idea of the learning with errors (LWE) problem discovered by Regev in 2005 [Reg] and the Ring LWE [LPR]. The security of this system depends the hardness of certain lattice problem, which can be mathematically proven hard [DALSS]. This system involves only simple multiplication and therefore is very efficient. Such a system can also resist the future quantum computer attacks.

This invention contains an additive construction of PAKE with either explicit authentication or implicit authentication. Furthermore, this invention can be modified slightly to build multiplicative version.

Though this invention has been described with specific embodiments thereof, it is clear that many variations, alternatives, or modifications will become apparent to those who are skilled in the art of cryptography. Therefore, the preferred embodiments of the invention as set forth herein, are intended to be illustrative, not limiting. Various changes may be made without departing from the scope and spirit of the invention as set forth herein and defined in the claims. The claims in this invention are based on the U.S. provisional patent application with Ser. No. 62/215,186, entitled "Password Based Key Exchange from Ring Learning with Errors", filed Sep. 8, 2012, only more technical details are added.

DETAILED DESCRIPTION OF THE INVENTION

1.1 the Basic Background

Figure 1:
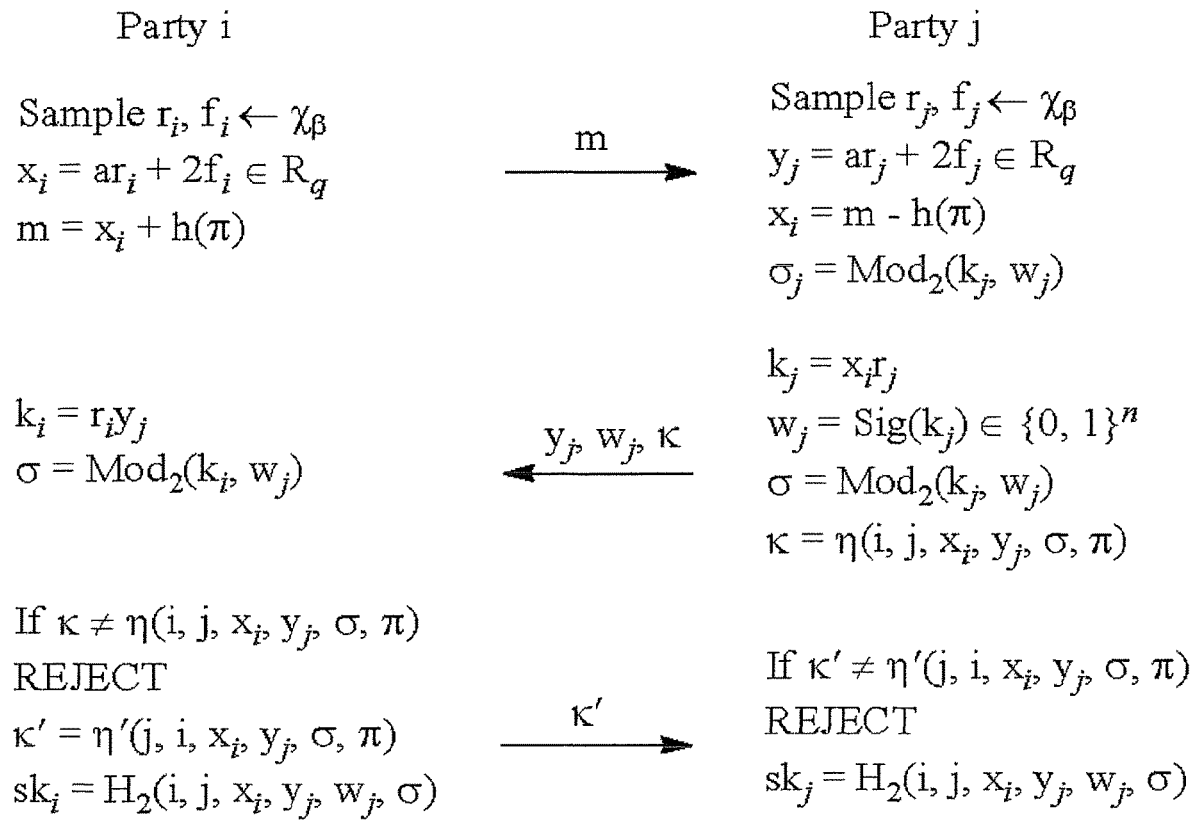
FIG. 1 illustrates an example of a key exchange with explicit authentication.

The learning with errors (LWE) problem, introduced by Regev in 2005 [Reg], and its extension, the ring learning with errors (RLWE) problem [LPR] have broad application in cryptographic constructions with some good provable secure properties. The main claim is that they are as hard as certain worst-case lattice problems and hence the related cryptographic constructions.

A LWE problem can be described as follows. First, we have a parameter n, a (prime) modulus q, and an error probability distribution κ on the finite ring (field) $\mathbb{Z}_q$ with q elements. To simplify the exposition, we will take q to be an odd prime but we can also work on any whole number except that we may need to make slight modifications.

In $\mathbb{Z}_q$, each element is represented by the set $\{-(q-1)/2, \ldots, 0, \ldots, (q-1)/2\}$. In this exposition, by "an error" distribution, we mean a distribution such that if we select an element following this distribution, there is a high probability we will select an element, which is small. There are many such selections and the selections directly affect the security of the system. One should select good error distribution to make sure the system works well and securely.

Let $\Pi_{S,\kappa}$ on $\mathbb{Z}_q$ be the probability distribution obtained by selecting an element A in $F_q^n$ randomly and uniformly, choosing $e \in F_q$ according to κ, and outputting (A, <A, S>+e), where + is the addition that is performed in $F_q$. An algorithm that solves the LWE problem with modulus q and error distribution κ, if, for any S in $F_q^n$, with an arbitrary number of independent samples from $\Pi_{S,\kappa}$, it outputs S (with high probability).

To achieve the provable security of the related cryptographic constructions based on the LWE problem, one chooses q to be specific polynomial functions of n, that is q is replaced by a polynomial functions of n, which we will denote as q(n), k to be certain discrete version of normal distribution centered around 0 with the standard deviation $\sigma = \alpha q \geq \sqrt{n}$, and elements of $F_q$ are represented by integers in the range $[-(q-1)/2, (q-1)/2)]$, which we denote as $k_\sigma$.

In the original encryption system based on the LWE problem, one can only encrypt one bit a time, therefore the system is rather inefficient and it has a large key size. To further improve the efficiency of the cryptosystems based on the LWE problem, a new problem, which is a LWE problem based on a quotient ring of the polynomial ring $F_q[x]$[LPR], was proposed. This is called the ring LWE (RLWE) problem. In the cryptosystems based on the RLWE problem, their security is reduced to hard problems on a subclass of lattices, the class of ideal lattices, instead of general lattices.

Later, a new variant of LWE was proposed in [ACPS]. This variant of the LWE problem is based on the LWE problem. We will replace a vector A with a matrix A of size m×n, and S also with a matrix of size n×1, such that they are compatible to perform matrix multiplication A×S. We also replace e with a compatible matrix of size m×1. We will work on the same finite field with q elements.

To simplify the exposition, we will only present PAKE, in detail, for the case using Ring LWE.

For all our constructions, we first define the following notations, which we will use throughout this application. Let n be a power of 2, and $f(x) = x^n + 1$. Let $q \approx 2^{\omega(\log n)}$ be an odd prime such that $q \mod 2n = 1$. Take $R = \mathbb{Z}[x]/\langle f(x) \rangle$ and $R_q = \mathbb{Z}_q[x]/\langle f(x) \rangle$ as above. For $\gamma \in \mathbb{R}^+$, let $H_1: \{0, 1\}^* \to X_\gamma = D_{\mathbb{Z}^n, \gamma}$ be a hash function with output distribution $X_\gamma$. Let $H_2: \{0, 1\}^* \to \{0, 1\}^k$ be the Key Derivation Function (KDF), where k is the bit-length of the final shared key. We model both functions as random oracles. Let $X_\alpha, X_\beta$ be two discrete Gaussian distributions with parameters $\alpha, \beta \in \mathbb{R}^+$. Let $\pi_{i,j}$ be the shared password of parties i and j, and let h: $\{0, 1\}^* \to R_q$ be a uniform hash function used to hide the password.

We now define the Sig and $\mathrm{Mod}_2$ functions. We denote $$\mathbb{Z}_q = \left\{-\frac{q-1}{2}, \ldots, \frac{q-1}{2}\right\},$$

and consider the set $$E := \left\{-\left\lfloor \frac{q}{4} \right\rfloor, \ldots, \left\lfloor \frac{q}{4} \right\rfloor\right\},$$

i.e. the "middle" of $\mathbb{Z}_q$. Recall that Sig is simply the characteristic function of the complement E[DiLi], and that $\mathrm{Mod}_2: \mathbb{Z}_q \times \{0, 1\} \to \{0, 1\}$ is defined as:

$$\mathrm{Mod}_2(v, b) = \left(v + b \cdot \frac{q-1}{2}\right) \mod q \mod 2.$$

When Sig, $\mathrm{Mod}_2$ are applied to a ring elements, it will apply to each coefficient of the ring element. Sig was also denoted by Cha before, and they are the same function with different notation.

We will leave off the subscripts on π in what follows when the parties involved are clear from context.

1.1 the Construction of the PAKE with Explicit Authentication

We also take verification hashes η, η' to ensure both parties are mutually authenticated. Our protocol consists of the following steps, illustrated in FIG. 1:

Initiation Party i randomly samples $r_i, f_i \leftarrow X_\beta$, computes $x_i = ar_i + 2f_i$, and sends $m = x_i + h(\pi)$ to party j.

Response Party j receives $x_i + h(\pi)$ from party i and recovers $x_i = m - h(\pi)$. Party j then randomly samples $r_j, f_j \leftarrow X_\beta$ and computes $y_j = ar_j + 2f_j$ and $k_j = x_i \cdot r_j$.

Next, party j computes $w_j = \mathrm{Sig}(k_j) \in \{0, 1\}^2$ and $\sigma = \mathrm{Mod}_2(k_j, w_j)$. Party j sends $y_j$, $w_j$, and $\kappa = \eta(i, j, x_i, y_j, \sigma, \pi)$ to party i. Lastly, derives the session key $sk_j = H_2(i, j, x_i, y_j, w_j, \sigma)$.

Finish Party i computes $k_i = r_i \cdot y_j$ and $\kappa' = \eta'(j, i, x_i, y_j, \sigma, \pi)$.

Finally, party i computes $\sigma = \mathrm{Mod}_2(k_i, w_j)$ and derives the session key $sk_i = H_2(i, j, x_i, y_j, w_j, \sigma)$. Party i also verifies that $\kappa = \eta(i, j, x_i, y_j, \sigma, \pi)$ matches the value of κ received from party j. If it does not, party i ends the communication. If it does, party i sends κ' to party j, who verifies it in the same way.

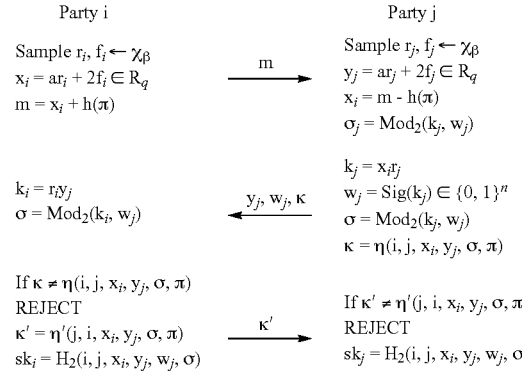

Figure 2:
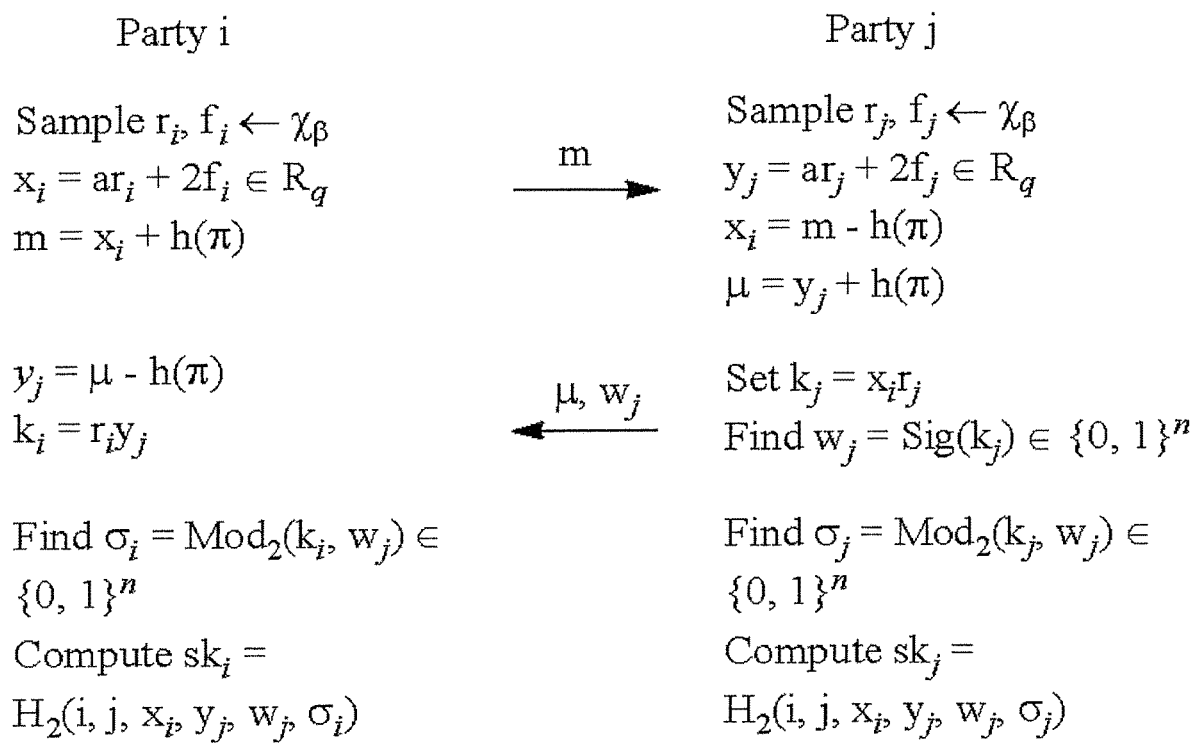
FIG. 2 illustrates an example of a key exchange with implicit authentication.

FIG. 1: Explicitly Authenticated Protocol 1.2 the Construction of the PAKE with Implicit Authentication We construct here, as illustrated in FIG. 2 illustrates a variation of the protocol that gives implicit authentication, similar to the PPK variation on the PAK protocol. If either party provides an incorrect password, then the parties' "shared" keys will not actually match, effectively preventing communication without explicitly checking for matching passwords.

Initiation Party i randomly samples $r_i, f_i \leftarrow X_\beta$, computes $x_i = ar_i + 2f_i$, and sends $m = x_i + h(\pi)$ to party j.

Response Party j receives $x_i + h(\pi)$ from party i and recovers $x_i = m - h(\pi)$. Party j then randomly samples $r_j, f_j \leftarrow X_\beta$ and computes $y_j = ar_j + 2f_j$ and $k_j = x_i \cdot r_j$.

Next, party j computes $w_j = \mathrm{Sig}(k_j) \in \{0, 1\}^2$. Party j sends $\mu = y_j + h(\pi)$ and $w_j$ to party i. Lastly, party j computes $\sigma_j = \mathrm{Mod}_2(k_j, w_j)$ and derives the session key $sk_j = H_2(i, j, x_i, y_j, w_j, \sigma_j)$.

Finish Party i recovers the pair $(y_j, w_j)$, and uses it compute $k_i = r_i \cdot y_j$.

Finally, party i computes $\sigma_i = \text{Mod}_2(k_i, w_j)$ and derives the session key $sk_i = H_2(i, j, x_i, y_j, w_j, \sigma_i)$.

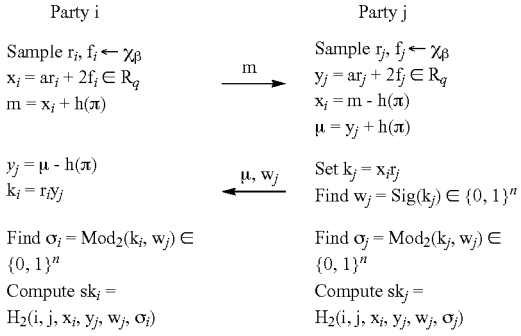

FIG. 2: Implicitly Authenticated Protocol

1.3 the Construction of Multiplicative Version the PAKE

Figure 3:
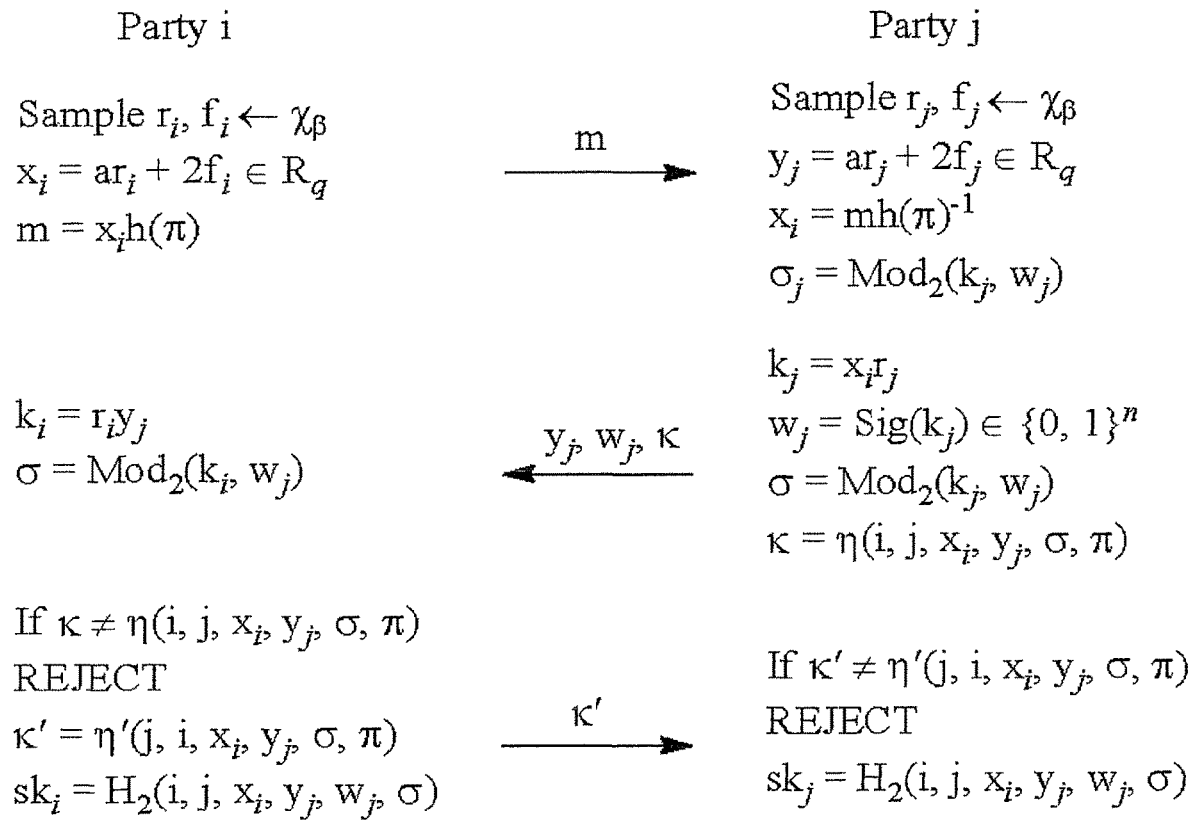
FIG. 3 illustrates an example of a key exchange method using a multiplicative protocol.

In addition to the two protocols above, FIG. 3 illustrates how we can also blind the protocol messages by multiplying by the hashed password rather than adding as done above. Note that this form only works if $h(\pi)$ is invertible in the ring, but that condition will usually be met.

Initiation Party i randomly samples $r_i, f_i \leftarrow X\beta$, computes $x_i = ar_i + 2f_i$, and sends $m = x_i \cdot h(\pi)$ to party j.

Response Party j receives $x_i \cdot h(\pi)$ from party i and recovers $x_i = m \cdot h(\pi)^{-1}$. Party j then randomly samples $r_j, f_j \leftarrow X\beta$ and computes $y_j = ar_j + 2f_j$ and $k_j = x_i \cdot r_j$.

Next, party j computes $w_j = \text{Sig}(k_j) \in \{0, 1\}^2$ and $\sigma = \text{Mod}_2(k_j, w_j)$. Party j sends $y_j$, $w_j$, and $\kappa = \eta(i, j, x_i, y_j, \sigma, \pi)$ to party i. Lastly, derives the session key $sk_j = H_2(i, j, x_i, y_j, w_j, \sigma)$.

Finish Party i computes $k_i = r_i \cdot y_j$ and $\kappa' = \eta'(j, i, x_i, y_j, \sigma, \pi)$.

Finally, party i computes $\sigma = \text{Mod}_2(k_i, w_j)$ and derives the session key $sk_i = H_2(i, j, x_i, y_j, w_j, \sigma)$. Party i also verifies that $\kappa = \eta(i, j, x_i, y_j, \sigma, \pi)$ matches the value of $\kappa$ received from party j. If it does not, party i ends the communication. If it does, party i sends $\kappa'$ to party j, who verifies it in the same way.

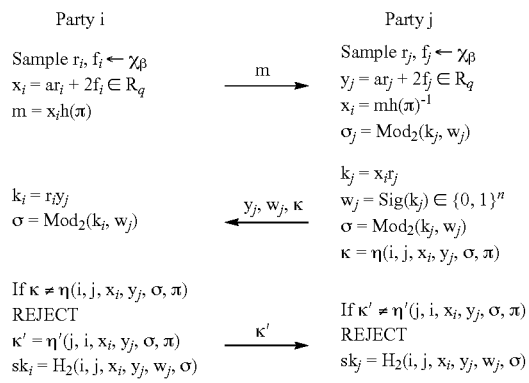

FIG. 3: Multiplicative Protocol

We can also apply the multiplicative variant to the implicitly authenticated version, as described below, with respect to FIG. 4:

Initiation Party i randomly samples $r_i, f_i \leftarrow X\beta$, computes $x_i = ar_i + 2f_i$, and sends $m = x_i \cdot h(\pi)$ to party j.

Response Party j receives $x_i \cdot h(\pi)$ from party i and recovers $x_i = m \cdot h(\pi)^{-1}$. Party j then randomly samples $r_j, f_j \leftarrow X\beta$ and computes $y_j = ar_j + 2f_j$ and $k_j = x_i \cdot r_j$.

Next, party j computes $w_j = \text{Sig}(k_j) \in \{0, 1\}^2$. Party j sends $\mu = y_j \cdot h(\pi)^{-1}$ and $w_j$ to party i. Lastly, party j computes $\sigma_j = \text{Mod}_2(k_j, w_j)$ and derives the session key $sk_j = H_2(i, j, x_i, y_j, w_j, \sigma_j)$.

Finish Party i recovers the pair $(y_j, w_j)$, and uses it compute $k_i = r_i \cdot y_j$.

Figure 5:
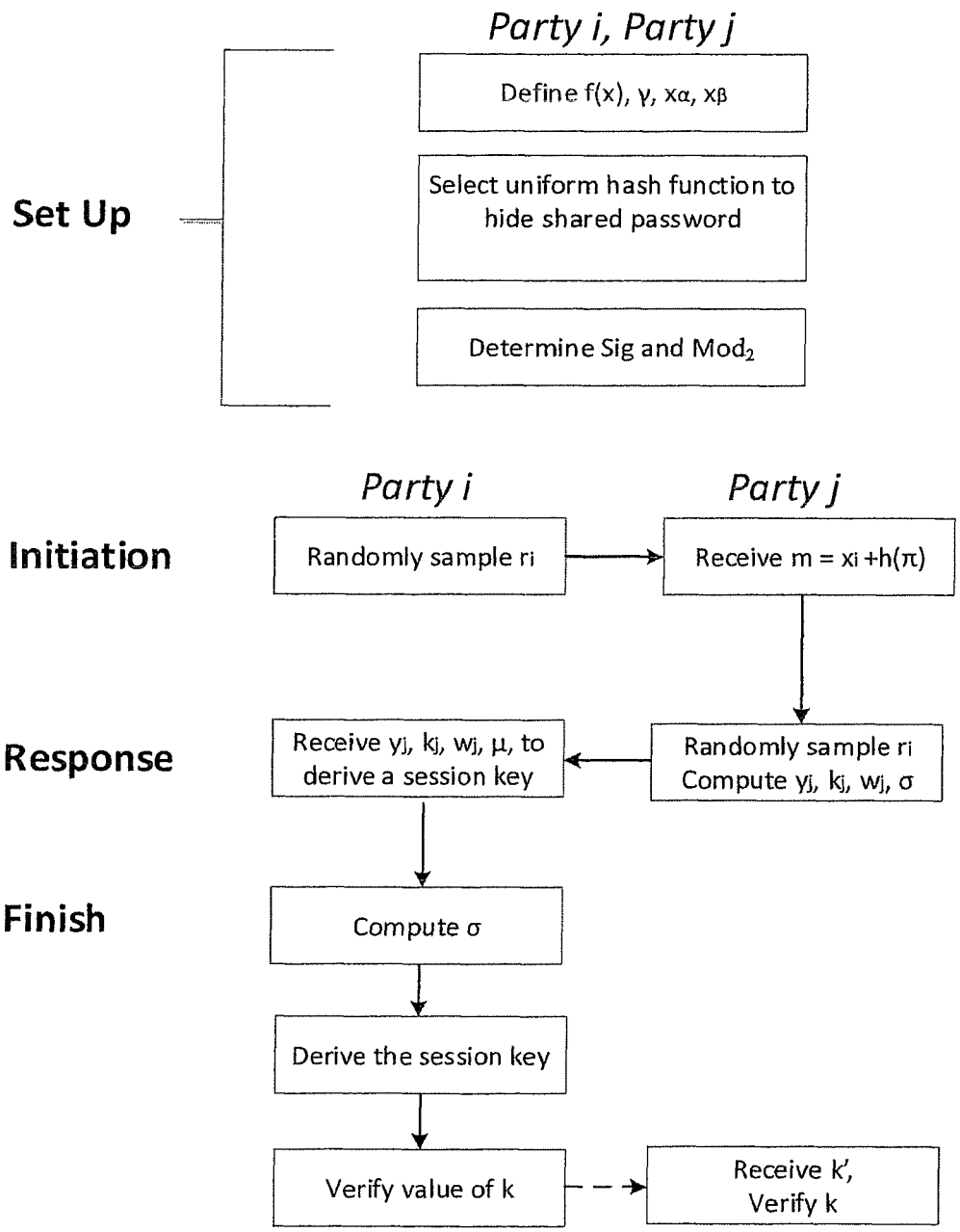
FIG. 5 illustrates a method for establishing a key exchange in accordance with embodiments discussed herein.

FIG. 5 illustrates the novel method for establishing a key exchange between Parties i, j, in accordance with various embodiments discussed herein.

Finally, party i computes $\sigma_i = \text{Mod}_2(k_i, w_j)$ and derives the session key $sk_i = H_2(i, j, x_i, y_j, w_j, \sigma_i)$.

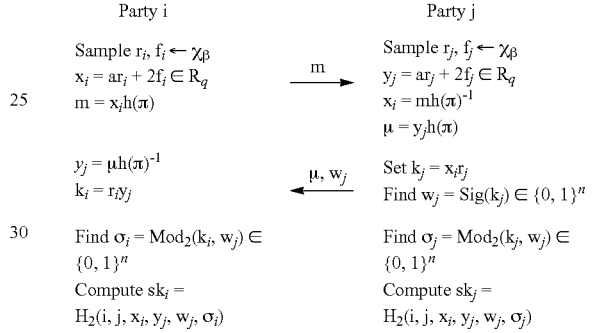

Figure 4:
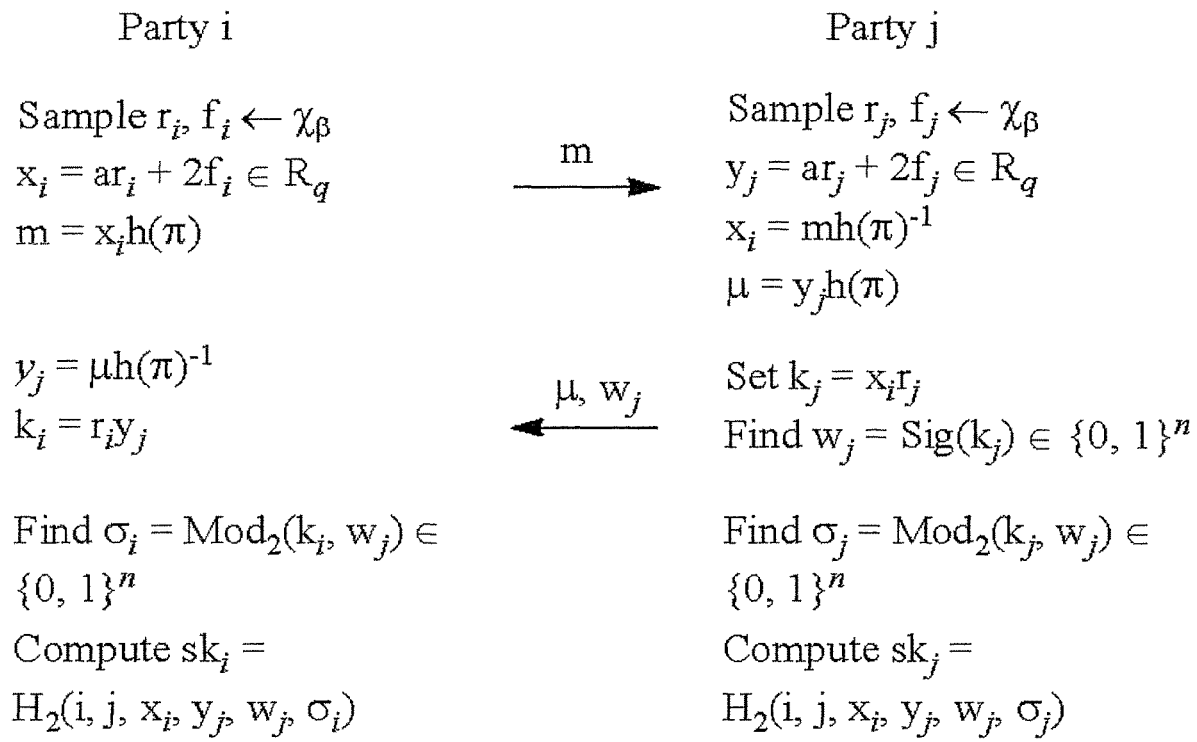
FIG. 4 illustrates an example of a key exchange method using a multiplicative, implicitly authenticated protocol.

FIG. 4: Multiplicative Implicitly Authenticated Protocol

LITERATURE CITED

[ACPS] B. Applebaum, D. Cash, C. Peikert, A. Sahai; Fast Cryptographic Primitives and Circular-Secure Encryption Based on Hard Learning Problems. Advances in Cryptology-CRYPTO 2009, Lecture Notes in Computer Science, Volume 5677 pp 595-618, 2009

[BMc] Boyko, V.; P. MacKenzie; S. Patel (2000). "Provably Secure Password-Authenticated Key Exchange Using Diffie-Hellman". Advances in Cryptology—Eurocrypt 2000, LNCS. Lecture Notes in Computer Science. Springer-Verlag. 1807: 156?171.

[COP] D. Coppersmith, Shmuel Winograd, Matrix multiplication via arithmetic progressions, Journal of Symbolic Computation—Special issue on computational algebraic complexity archive 9 (3), pp 251-280, 1990

[DALSS] Jintai Ding, Saed Alsayigh, Jean Lancrenon, Saraswathy R V, Michael Snook, Provably Secure Password Authenticated Key Exchange Based on RLWE for the Post-Quantum World, Cryptology ePrint Archive: Report 2016/552

[DiHe] W. Diffie, M. Hellman, New directions in cryptography, IEEE Transactions on Information Theory 22 (6), pp 644-54, 1976.

[DiLi] J. Ding, X. Lin, A Simple Provably Secure Key Exchange Scheme Based on the Learning with Errors Problem, Cryptology ePrint Archive, Report 688, 2012

[LPR] V. Lyubashevsky, C. Peikert, O. Regev, On ideal lattices and learning with errors over rings In Eurocrypt 2010

[Mc] MacKenzie, P.: On the Security of the SPEKE Password-Authenticated Key Exchange Protocol. Cryptology ePrint Archive, Report 2001/057 (2001), http://eprint.iacr.org/2001/057

[REG] O. Regev, On lattices, learning with errors, random linear codes, and cryptography, in Proceedings of the 37th Annual ACM Symposium on Theory of Computing—STOC05, ACM, pp 84-93, 2005

[SHO] P. Shor, Polynomial-time algorithms for prime factorization and discrete logarithms on a quantum computer, SIAM Journal of Computing 26, pp. 1484-1509, 1997.

The invention claimed is:

1. A computer-implemented method for establishing a key exchange over an open channel between a first Party i and a second Party j with a shared password and explicit authentication, comprising:

(Set Up) defining, by Party i and Party j, a function $f(x)=x^n+1$, wherein n is a power of 2, $q \approx \omega(\log n)$ is an odd prime such that q mod 2n=1, and $R=\mathbb{Z}[x]/\langle f(x) \rangle$ and $R_q=\mathbb{Z}_q[x]/\langle f(x) \rangle$, selecting $\gamma \in \mathbb{R}^+$, wherein $H_1: \{0,1\}^* \to x_\gamma = D_{\mathbb{Z}^n, \gamma}$ is a hash function with output distribution $x_\gamma$, $H_2: \{0,1\}^* \to \{0,1\}^k$ is a Key Derivation Function (KDF) such that k is the bit-length of a final shared key, defining $x_\alpha$, $x_\beta$ as two discrete Gaussian distributions with parameters $\alpha, \beta \in \mathbb{R}^+$, wherein $\pi_{i,j}$ is the shared password of Party i and Party j, selecting h: $\{0,1\}^* \to R_q$ as a uniform hash function to hide the shared password, and determining Sig and $Mod_2$ functions, such that $$\mathbb{Z}_q = \left\{ -\frac{q-1}{2}, \ldots, \frac{q-1}{2} \right\},$$

set $$E := \left\{ -\left\lfloor \frac{q}{4} \right\rfloor, \ldots, \left\lfloor \frac{q}{4} \right\rfloor \right\}$$

is considered to be a middle portion of $\mathbb{Z}_q$, Sig is a characteristic function of a complement of E[DiLi], and $Mod_2: \mathbb{Z}_q \times \{0,1\} \to \{0,1\}$ is defined as $$Mod_2(v, b) = \left( v + b \cdot \frac{q-1}{2} \right) \bmod q \bmod 2,$$

wherein, when Sig and $Mod_2$ are applied to a ring element, Sig and $Mod_2$ apply to each coefficient of the ring element;

(Initiation) randomly sampling $r_i$, by Party i, wherein $f_i \leftarrow x_\beta$, computes $x_i = ar_i + 2f_i$, and sending $m = x_i + h(\pi)$ to Party j;

(Response) receiving, at Party j, $x_i + h(\pi)$ from party i, and recovering $x_i = m - h(\pi)$, randomly sampling $r_j$, at Party j, $f_j \leftarrow x_\beta$ computing $y_j = ar_j + 2f_j$ and $k_j = x_i \cdot r_j$, computing, at Party j, $w_j = Sig(k_j) \in \{0,1\}^2$ and $\sigma = Mod_2(k_j, w_j)$, and sending $y_j$, $w_j$, and $\kappa = \eta(i, j, x_i, y_j, \sigma, \pi)$ to Party i to derive a session key $sk_j = H_2(i, j, x_i, y_j, w_j, \sigma)$;

(Finish) computing, at Party i, $k_i = r_i \cdot y_j$ and $\kappa' = \eta'(j, i, x_i, y_j, \sigma, \pi)$, computing, at Party i, $\sigma = Mod_2(k_i, w_j)$, deriving the session key $sk_i = H_2(i, j, x_i, y_j, w_j, \sigma)$, verifying whether $\kappa = \eta(i, j, x_i, y_j, \sigma, \pi)$ matches the value of $\kappa$ received from party j, wherein $\kappa$ does not match the value of $\kappa$ received from Party j, Party i ends the communication, and when $\kappa$ does match the value of $\kappa$ received from Party j, Party i sends $\kappa'$ to Party j to verify the value of $\kappa$.

2. The computer-implemented method, according to claim 1, further comprising:

in the Response step, sending $\mu = y_j + h(\pi)$ and $w_j$ to Party i by Party j, and computing, by Party j, $\sigma_j = Mod_2(k_j, w_j)$; and in the Finish step, recovering the pair $(y_j, w_j)$ from Party i, and using the pair to compute $k_i = r_i \cdot y_j$.

3. The computer-implemented method, for establishing a key exchange over an open channel between a first Party i and a second Party j with a shared password and explicit authentication by multiplication of hashed password, comprising:

(Set Up) defining, by Party i and Party j, a function $f(x)=x^n+1$, wherein n is a power of 2, $q \approx \omega(\log n)$ is an odd prime such that q mod 2n=1, and $R=\mathbb{Z}[x]/\langle f(x) \rangle$ and $R_q=\mathbb{Z}_q[x]/\langle f(x) \rangle$, selecting $\gamma \in \mathbb{R}^+$, wherein $H_1: \{0,1\}^* \to x_\gamma = D_{\mathbb{Z}^n, \gamma}$ is a hash function with output distribution $x_\gamma$, $H_2: \{0,1\}^* \to \{0,1\}^k$ is a Key Derivation Function (KDF) such that k is the bit-length of a final shared key, defining $x_\alpha$, $x_\beta$ as two discrete Gaussian distributions with parameters $\alpha, \beta \in \mathbb{R}^+$, wherein $\pi_{i,j}$ is the shared password of Party i and Party j, selecting h: $\{0,1\}^* \to R_q$ as a uniform hash function to hide the shared password, and determining Sig and $Mod_2$ functions, such that $$\mathbb{Z}_q = \left\{ -\frac{q-1}{2}, \ldots, \frac{q-1}{2} \right\},$$

set $$E := \left\{ -\left\lfloor \frac{q}{4} \right\rfloor, \ldots, \left\lfloor \frac{q}{4} \right\rfloor \right\}$$

is considered to be a middle portion of $\mathbb{Z}_q$, Sig is a characteristic function of a complement of E[DiLi], and $Mod_2: \mathbb{Z}_q \times \{0,1\} \to \{0,1\}$ is defined as $$Mod_2(v, b) = \left( v + b \cdot \frac{q-1}{2} \right) \bmod q \bmod 2,$$

wherein, when Sig and $Mod_2$ are applied to a ring element, Sig and $Mod_2$ apply to each coefficient of the ring element;

(Initiation) randomly sampling $r_i$, by Party i, wherein $f_i \leftarrow x_\beta$, computes $x_i = ar_i + 2f_i$, and sending $m = x_i + h(\pi)$ to Party j;

(Response) receiving, at Party j, $x_i \cdot h(\pi)$ from party i, and recovering $x_i = m \cdot h(\pi)^{-1}$, randomly sampling $r_j$ at Party j, $f_j \leftarrow x_\beta$ computing $y_j = ar_j + 2f_j$ and $k_j = x_i \cdot r_j$, computing, at Party j, $w_j = \text{Sig}(k_j) \in \{0,1\}^2$ and $\sigma = \text{Mod}_2(k_j, w_j)$, and sending $y_j$, $w_j$, and $\kappa = \eta(i, j, x_i, y_j, \sigma, \pi)$ to Party i to derive a session key $sk_j = H_2(i, j, x_i, y_j, w_j, \sigma)$;

(Finish) computing, at Party i, $k_i = r_i \cdot y_j$ and $\kappa' = \eta'(j, i, x_i, y_j, \sigma, \pi)$, computing, at Party i, $\sigma = \text{Mod}_2(k_i, w_j)$, deriving the session key $sk_i = H_2(i, j, x_i, y_j, w_j, \sigma)$, verifying whether $\kappa = \eta(i, j, x_i, y_j, \sigma, \pi)$ matches the value of $\kappa$ received from party j, wherein $\kappa$ does not match the value of $\kappa$ received from Party j, Party i ends the communication, and when $\kappa$ does match the value of $\kappa$ received from Party j, Party i sends $\kappa'$ to Party j to verify the value of $\kappa$.

4. The computer-implemented method according to claim 3, further comprising:

in the Response step, sending $\mu = y_j + h(\pi)^{-1}$ and $w_j$ to Party i by Party j, and computing, by Party j, $\sigma_j = \text{Mod}_2(k_j, w_j)$; and in the Finish step, recovering the pair $(y_j, w_j)$ from Party i, and using the pair to compute $k_i = r_i \cdot y_j$.

5. The computer-implemented method according to claim 1, wherein the "Set Up" step defines a q, n distribution.

6. The computer-implemented method according to claim 1, wherein the "Set Up" step selects parameters from a LWE problem.

7. The computer-implemented method according to claim 1, wherein one of Party i and Party j is a server and the other a client.

8. The computer-implemented method according to claim 1, wherein the shared key is derived from a similar rounding technique.

9. The computer-implemented method according to claim 2, wherein the "Set Up" step defines a q, n distribution.

10. The computer-implemented method according to claim 2, wherein the "Set Up" step selects parameters from a LWE problem.

11. The computer-implemented method according to claim 2, wherein one of Party i and Party j is a server and the other a client.

12. The computer-implemented method according to claim 2, wherein the shared key is derived from a similar rounding technique.

13. The computer-implemented method according to claim 3, wherein the "Set Up" step defines a q, n distribution.

14. The computer-implemented method according to claim 3, wherein the "Set Up" step selects parameters from a LWE problem.

15. The computer-implemented method according to claim 3, wherein one of Party i and Party j is a server and the other a client.

16. The computer-implemented method according to claim 3, wherein the shared key is derived from a similar rounding technique.

17. The computer-implemented method according to claim 4, wherein the "Set Up" step selects a q, n distribution.

18. The computer-implemented method according to claim 4, wherein the "Set Up" step selects parameters from a LWE problem.

19. The computer-implemented method according to claim 6, wherein the parameters utilize matrix operations.

20. The computer-implemented method according to claim 14, wherein the parameters utilize matrix operations.

* * * * *